Figure 1:
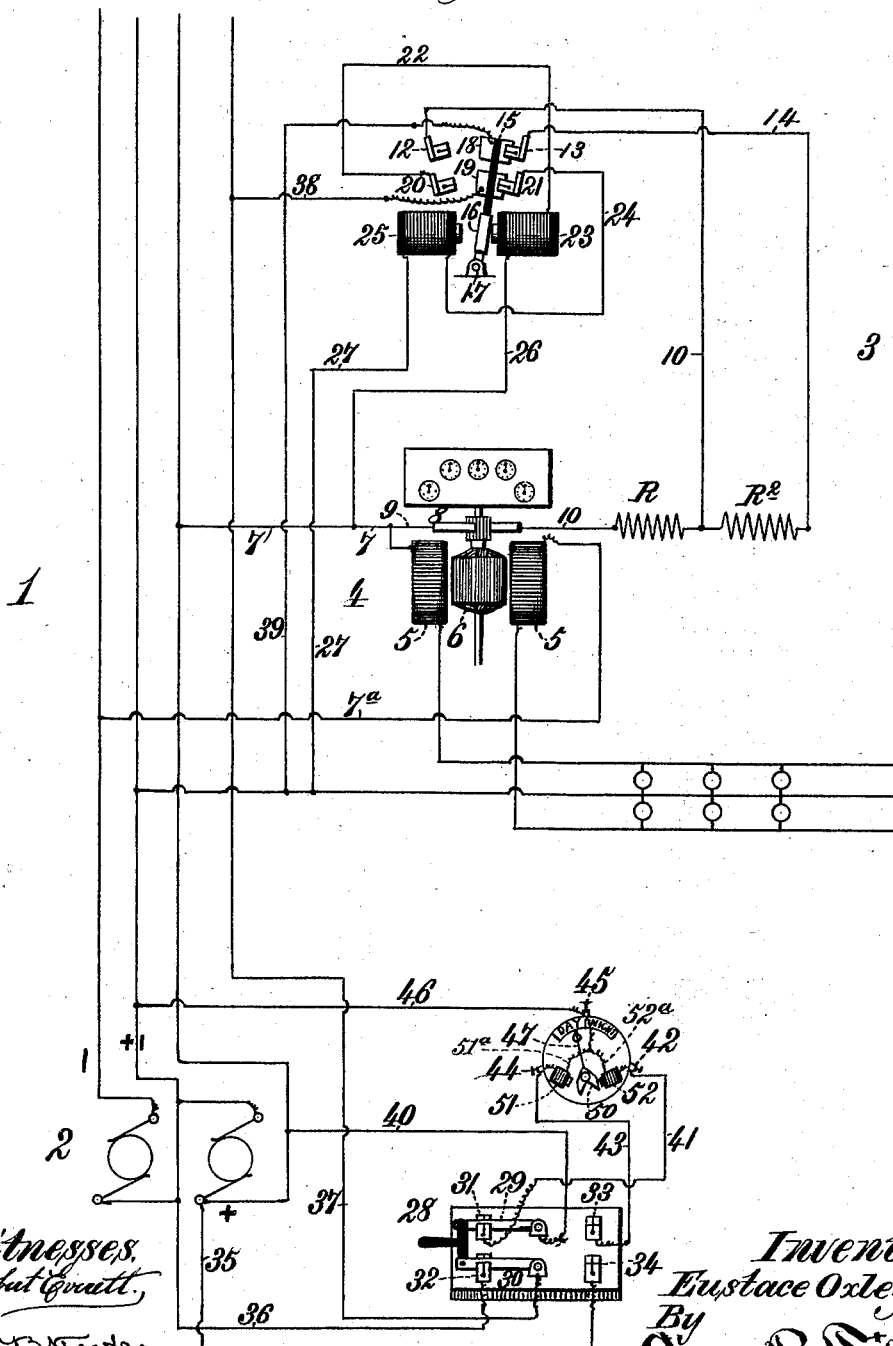

(No Model.) 2 Sheets—Sheet 1.
E. OXLEY.
METHOD OF AND APPARATUS FOR MULTIPLE RATE METERING FOR ELECTRIC CURRENTS.

No. 591,194. Patented Oct. 5, 1897.

(No Model.)  2 Sheets—Sheet 2.

E. OXLEY.
METHOD OF AND APPARATUS FOR MULTIPLE RATE METERING FOR ELECTRIC CURRENTS.

No. 591,194. Patented Oct. 5, 1897.

Witnesses
Robert Cometh
Th. B. Keefe

Inventor:
Eustace Oxley.
By Chas. B. Tilden
Atty.

UNITED STATES PATENT OFFICE.

EUSTACE OXLEY, OF WASHINGTON, DISTRICT OF COLUMBIA.

METHOD OF AND APPARATUS FOR MULTIPLE RATE-METERING FOR ELECTRIC CURRENTS.

SPECIFICATION forming part of Letters Patent No. 591,194, dated October 5, 1897.

Application filed August 23, 1897. Serial No. 649,269. (No model.)

*To all whom it may concern:*

Be it known that I, EUSTACE OXLEY, a subject of the Queen of Great Britain, residing at Washington, District of Columbia, have invented certain new and useful Improvements in Methods of and Apparatus for Multiple Rate-Metering for Electric Currents, of which the following is a specification.

My present invention relates to methods o and apparatus for multiple rate-metering for electric currents, and it is an improvement upon the subject-matter of two applications for Letters Patent filed by me in the United States Patent Office upon the 19th day of June, 1897, Serial No. 641,508, and another filed of even date herewith, Serial No. 649,270.

In these applications, the former of which was merged in Letters Patent upon the 17th day of August, 1897, No. 588,170, I have shown and described two different ways of metering electric energy consumed, one method being dependent upon the use of two separate metering mechanisms at each consumer's station, and the latter method is capable of successful and practically-accurate operation with a single meter only. In my other application I disclose another method and show a working installation of the same in which a single meter only is required at each point of consumption, the differential registration being accomplished by connecting the armature between the two outside wires or between one of the outside wires and the neutral wire of a three-wire system. By this method the armature will rotate at one-half the speed under the arrangement of circuits last described that it will when connected between the positive and negative wires. Now if the consumer be charged at full rate at all hours he will nevertheless get his current during the day at about half-price, since the meter registers at half-speed only during the daylight hours.

It is the purpose of my present invention to provide a method and apparatus requiring but a single meter at each point of consumption, whereby the speed of the registering mechanism may be varied to any predetermined degree or by any desired ratio as compared with its normal movement. It is my object to accomplish this by the insertion in and removal from the armature-circuit of a meter of a resistance sufficient to cut down the current to a point at which the revolution of such armature shall be retarded to the required degree.

My invention also comprises the control of this variance in resistance from a suitable single point—such, for example, as the generating-station—and the accomplishment of the end in view in such manner as to secure practically accurate registration at each point of consumption.

I also aim to provide means for practicing my invention, which can be installed without large expense, which will require the minimum of repair, and the operation of which twice each day will consume an amount of electric energy so small that many years of such use would be necessary to consume one cent's worth of said energy.

To enable those skilled in the art to which my invention pertains to understand and practice said invention, I will now proceed to explain the same in detail, reference being had for this purpose to the accompanying drawings, in which—

Figure 2:
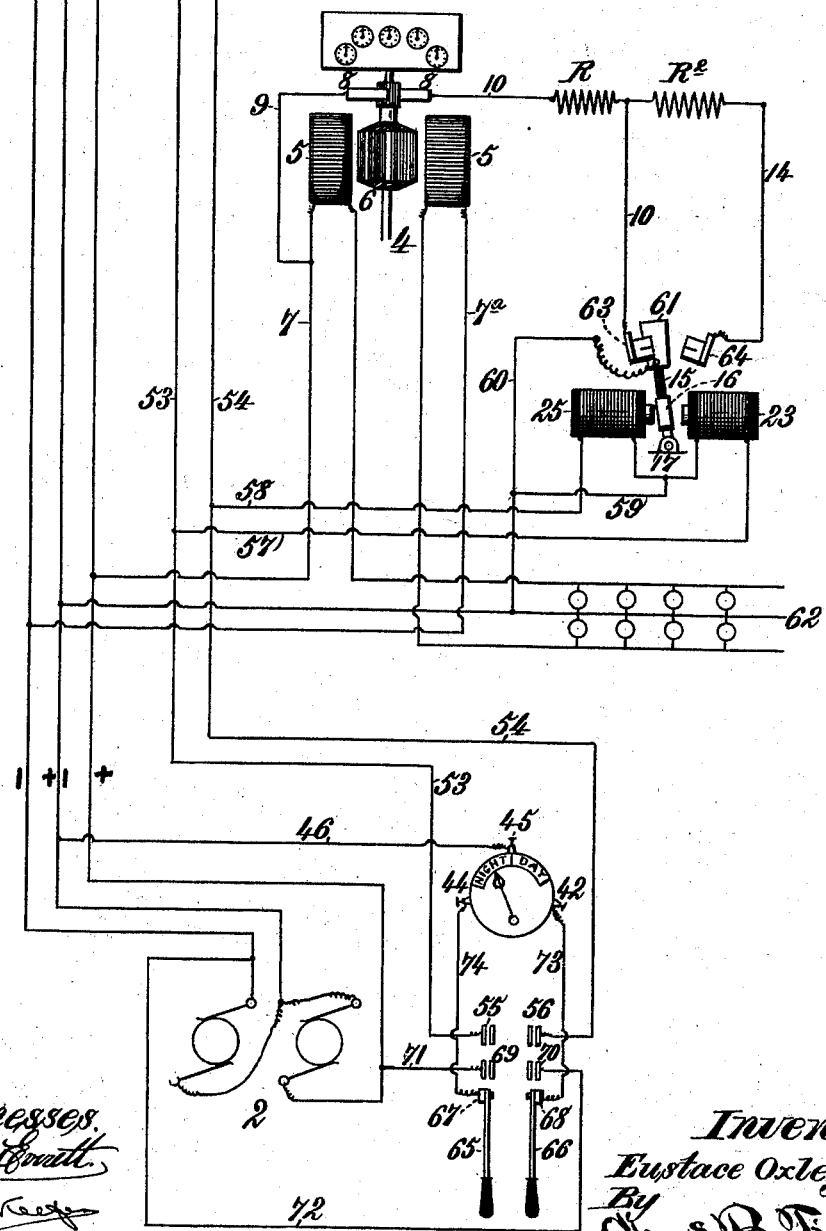

Figure 1 is a diagram showing an arrangement of circuits with an installation at a single point of consumption. Fig. 2 is a similar representation showing a modified form of control-circuit.

The reference-numeral 1 in said drawings indicates an ordinary three-wire system of electric distribution, the numeral 2 denoting the point of generation and 3 a single point of consumption. At the latter point a meter 4 is installed, its field-coils 5 and armature 6 being represented conventionally. The service-wires 7 and $7^a$, which connect said coils with the system and with the house-circuit, are arranged in the usual manner. One brush of the armature takes current from a wire 9, which is a branch from the service-wire 7. The other brush connects with a wire 10, which goes to the normal resistance R of the armature-circuit and from said resistance to a single clip 12 of a knife-switch which is installed at the same point with the meter or conveniently near it. From a single clip 13, opposite the clip 12 and a little distance from it, a wire 14 is led to a second resistance $R^2$, and from the latter a connection is made with the wire 10, between the first resistance R and the clip 12.

Between the two clips 12 and 13 is a non-conducting bar 15, mounted on an armature 16, which is pivoted upon or between lugs 17. The bar 15 carries two separate switch-blades 18 and 19, which project about equally on both sides of the bar, so that in one direction of vibration of the bar the blade 18 may enter the clip 12 and in the opposite direction it may enter the clip 13. At a little distance from said clips are two similar clips 20 and 21, one on each side of the bar 15 and so placed that the blades 18 and 19 will strike into the clips 12 and 20 simultaneously, and when moving in the opposite direction said blades will enter the clips 13 and 21 at the same time. From the clip 20 a wire 22 goes to an electromagnet 23 on one side of the armature 16, and from the clip 21 a wire 24 goes to a like electromagnet 25 on the other side of said armature. The second terminal of the magnet-winding 23 is carried by a wire 26 to the service-wire 7. The second terminal of the magnet-winding 25 connects by a wire 27 to the neutral wire.

At the point of control is a small double-pole double-throw switch 28, having its conducting switch-bars 29 and 30 pivoted to lugs between two clips 31 and 32 on one side and two similar clips 33 and 34 on the other side. From the positive side of the system and from the neutral wire wires 35 and 36 are led to the clip 34 and to the clip 32 of the switch, respectively. From the switch-bar 30 a single control-wire 37 is led along the several points of consumption, and at each point a wire 38 is tapped off to the switch-blade 19 on the bar 15. From the blade 18 a wire 39 is led to the neutral wire.

From the positive side of the system a wire 40 is taken to the switch-bar 29. From the clip 31 of the control-switch a wire 41 goes to a binding-post 42 on an indicator which is placed in sight of the person operating the switch. A second wire 43 goes from the clip 33 to a second binding-post 44 on the indicator. From a third binding-post 45 a wire 46 is led to the neutral wire of the system. The indicator referred to consists of an index or pointer 47, mounted on a pivot, below which is an armature 50. On one side of the armature is an electromagnet 51 and on the other side a similar magnet 52. One terminal of the former goes to the binding-post 44 and one terminal of the magnet 52 goes to the other binding-post 42. The second terminals of the magnets are indicated by numerals $51^a$ and $52^a$. They are united and taken to the binding-post 45.

Upon the indicator-dial or other suitable support are placed the words "Day" and "Night" or any character or device that can suitably denote at which rate current is being metered.

It being understood that there are as many installations of the control apparatus as there are separate meters by which it is necessary to register consumption at two different rates, the operation is as follows: Upon the supposition that the time is during some hour of the day when the energy used is charged for at a reduced rate, it will be observed that the control-switch has been momentarily closed in the clips 31 and 32, in which the switch-bars 29 and 30 are shown as resting. By this operation the condition and arrangements of circuits shown in the main portion of the figure has been established. In such position the circuit of control will be from the positive side of the system over wire 40 to switch-bar 29, clip 31, wire 41, binding-post 42, magnet 52, terminal $52^a$, binding-post 45, and wire 46 to the neutral. This brings the pointer of the indicator over or near the word "Day." From the neutral wire of the system a current flows by wire 36 to clip 32, thence by switch-bar 30 to control-wire 37, over said wire to a wire 38, which goes to switch-blade 19. At the instant when this current was established said blade rested in the clip 20, so that current could pass from said clip by wire 22 to winding of magnet 23, and thence by wire 26 to the service-wire 7, which goes to the positive side of the system. This energizes magnet 23 and draws the armature 16 into the position shown in Fig. 1, thereby striking the blades 18 and 19 into the clips 13 and 21, as shown. The armature-circuit of the meter established hereby is by wire 7, branch wire 9, brushes 8, wire 10, resistances R $R^2$, wire 14, clip 13, switch-blade 18, and from the latter over wire 39, which connects said blade to the neutral wire. It will be seen that the meter-armature is thus getting its minimum of current, since both the normal resistance R and the insertible resistance $R^2$ are now in the armature-circuit. The registration therefore will be of a definite portion only of the whole consumption, and the charge therefore at full rate will fairly represent a reduced tariff during the day, since it is a full charge upon a reduced registration.

I have shown in Fig. 2 of the drawings a diagram including a modified form of control-circuit, comprising two wires, instead of one, and a slight corresponding change in the control-switch. In this figure the numerals 53 and 54 indicate the wires of the control-circuit. They are led from switch-clips 55 and 56, respectively, of the control-switch and pass along the whole number of those points where current is consumed at different rates during different periods. At each point branch wires 57 and 58 are tapped off to the first terminals of the electromagnets 23 and 25. The second terminals of the latter are united in a wire 59, which is tapped to a wire 60, the latter wire being a connection between a single switch-blade 61 on the insulating-bar 15 and the neutral wire of the house-circuit 62. The switch-blade 61 strikes alternately into clips 63 and 64, the former clip being con nected by the wire 10 through the normal resistance R of the armature to one brush 8 of the meter-armature and the latter clip 64 by the wire 14 through the insertible resistance $R^2$ to the wire 10 at a point between the clip 33 and the normal resistance R. The control-switch in this modification consists of two single-throw single-pole double-break switch-bars 65 and 66, pivoted to lugs 67 and 68 in line with the clips 55 and 56 and with two additional clips 69 and 70. A wire 71 is tapped off the positive side of the system to the clip 69 and a wire 72 taps off the negative side of the system to the clip 70. From the lugs 67 and 68 wires 74 and 73 are taken to the two binding-posts 44 and 42 of the indicator. From the binding-post 45 the wire 46 goes to the neutral wire of the system, as before. The indicator requires no explanation, as it is the same as in the first figure. The armature-bar 61 is vibrated in one direction by one of said switch-bars 65 and in the opposite direction by the other switch-bar 66. To meter the consumption at night, when full rate is paid, the switch-bar 66 is thrown into the clips 56 and 70, and the circuit thus established is from the negative side of the system over wire 72 to clip 70, over switch-bar 66 to clip 56, over wire 54, wire 58, winding of magnet 25, wire 59, and wire 60 to the neutral wire of the house-circuit. This energizes magnet 25 and draws the armature 16 into the position shown in the figure. At the same time the indicator-circuit is completed over the switch-bar 66 and wire 73 to binding-post 42, then through winding of magnet 52 (see Fig. 1) and by terminal $52^a$ and binding-post 45 over wire 46 to the neutral wire, turning the pointer to read "Night." The armature-circuit established for the meter by this operation is from the positive side of the system by wire 7, branch wire 9, brush 8, armature-winding and second brush 8, wire 10, through resistance R to clip 63, switch-blade 61, and wire 60 to the neutral wire.

The day rate is metered by inserting the resistance $R^2$ in the armature-circuit of the meter, as in Fig. 1. This is effected by closing the switch-bar 65 and throwing the switch-blade 61 into the clip 64. The circuits thereby established are so clearly evident as to require no explanation.

In operating the switches 65 and 66 they are closed only a second or two and then opened. To leave either switch closed any length of time would probably result in injury to the electromagnets 23 and 25 by burning out their coils. In the arrangement seen in Fig. 1, however, it is immaterial whether the switch be opened or left closed so far as the integrity of these coils is concerned since the circuit established, including either coil, is opened automatically between the switch-blade 19 and the clip 20 or the clip 21 at the instant that said blade is drawn out of either clip.

It is evident that I may adjust the insertible resistance $R^2$ in such manner that it will bear any predetermined relation to the normal resistance R. In this way I may retard the registering movement to a degree bearing any ratio to the normal movement.

What I claim is—

1. The method described of metering the consumption of electric energy at different rates during different periods of time, which consists in inserting a definite resistance in the armature-circuit of each one of a number of meters installed at a corresponding number of separate points of consumption, maintaining said resistances in said circuits during the period of consumption at a reduced charge, and withdrawing said resistances during the period of consumption at full rate substantially as described.

2. The method of metering the consumption of electric energy at different periods and rates which consists in inserting definite resistances in the armature-circuits of a series of meters during the hours of consumption at low or reduced rates, withdrawing said resistances during the hours of consumption at full rate or increased rate, and controlling the said insertion and withdrawal of these resistances from a single point, such as a central station, substantially as described.

3. In a three-wire system of electrical distribution, the combination with a number of meters, one at each point of consumption, of a corresponding number of definite resistances at said points, and means controlled from a single point for inserting said resistances in and withdrawing the same from the armature-circuits of the said meters, substantially as described.

4. In a system of electrical distribution, the combination of a number of meters at a corresponding number of points of consumption, of a control apparatus at each point, a circuit containing a resistance which can be thrown into and out of the armature-circuit of the meter at said point, and a control-switch at a single point to simultaneously insert and withdraw all said resistances from the armature-circuits of said meters, substantially as described.

5. In a system of electrical distribution the combination of a meter, of a control switch and circuit, an armature-circuit for the meter, a branch of said circuit containing a definite resistance, and a vibratory bar carrying a switch which is connected to a return-wire, to insert and withdraw said resistance in and from the armature-circuit of said meter, and electromagnets and circuits operated by the control-switch, substantially as described.

In testimony whereof I have hereunto set my hand in presence of two subscribing witnesses.

EUSTACE OXLEY.

Witnesses:
 EWELL A. DICK,
 CHAS. B. TILDEN.